J. M. DALY.
APPARATUS FOR STORING AND TRANSPORTING VEHICLES.
APPLICATION FILED MAY 15, 1916.
1,250,982.
Patented Dec. 25, 1917.
4 SHEETS—SHEET 1.
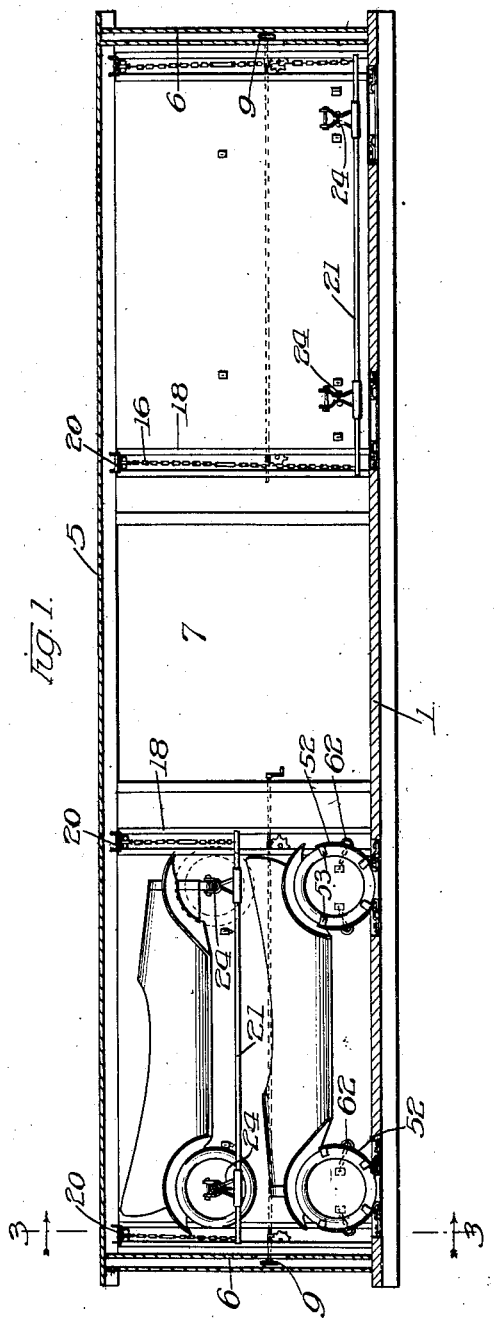
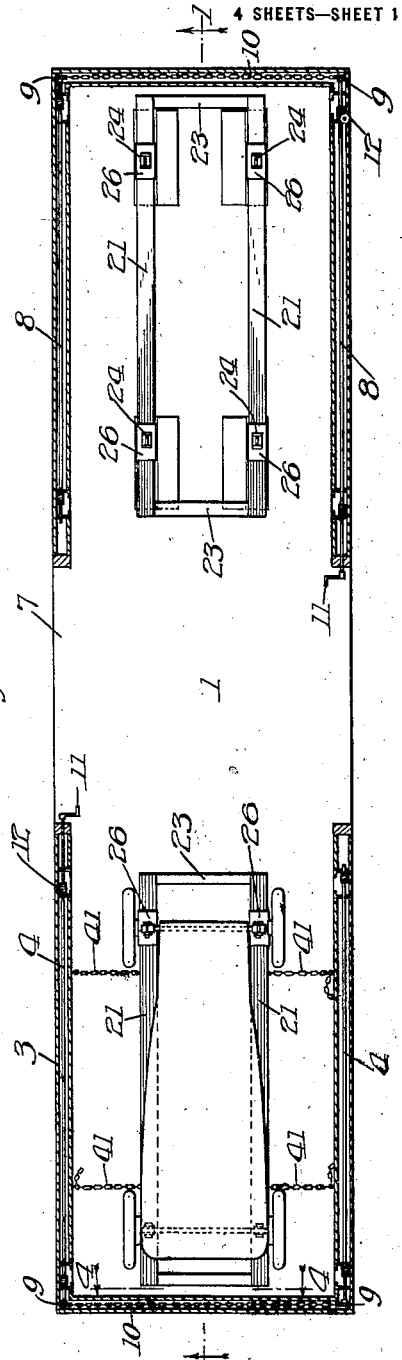

J. M. DALY.
APPARATUS FOR STORING AND TRANSPORTING VEHICLES.
APPLICATION FILED MAY 15, 1916.
1,250,982.
Patented Dec. 25, 1917.
4 SHEETS—SHEET 2.
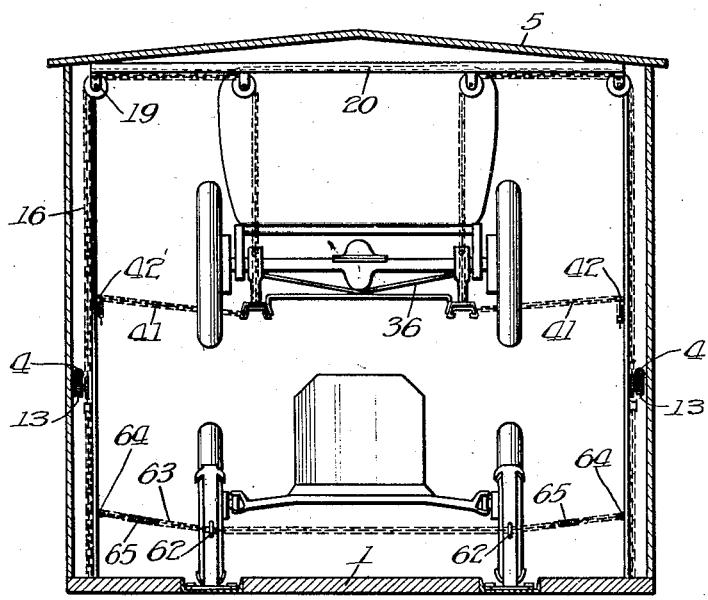
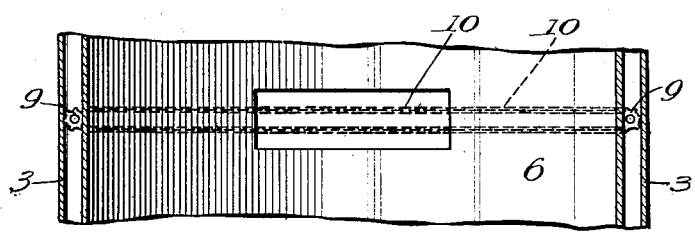
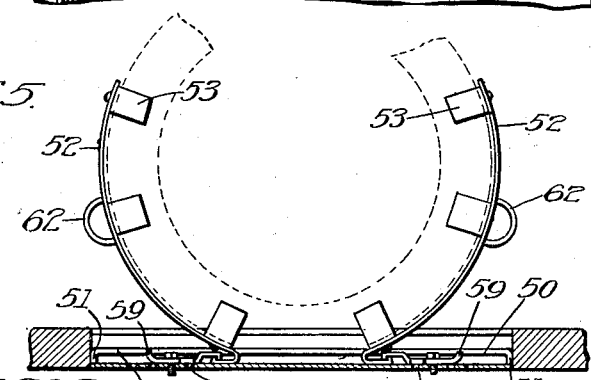

J. M. DALY.
APPARATUS FOR STORING AND TRANSPORTING VEHICLES.
APPLICATION FILED MAY 15, 1916.
1,250,982.
Patented Dec. 25, 1917.
4 SHEETS—SHEET 3.
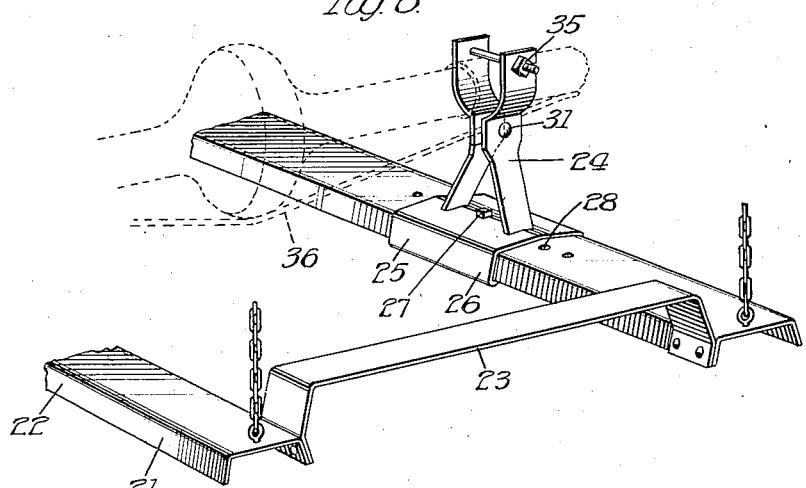
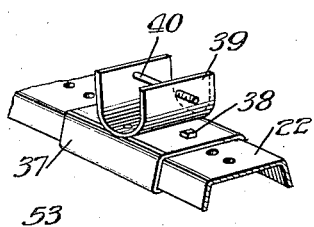
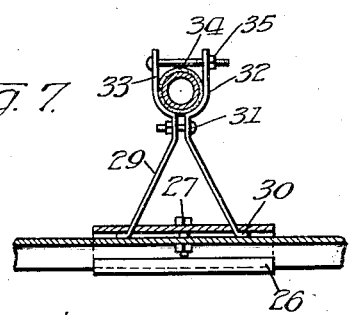
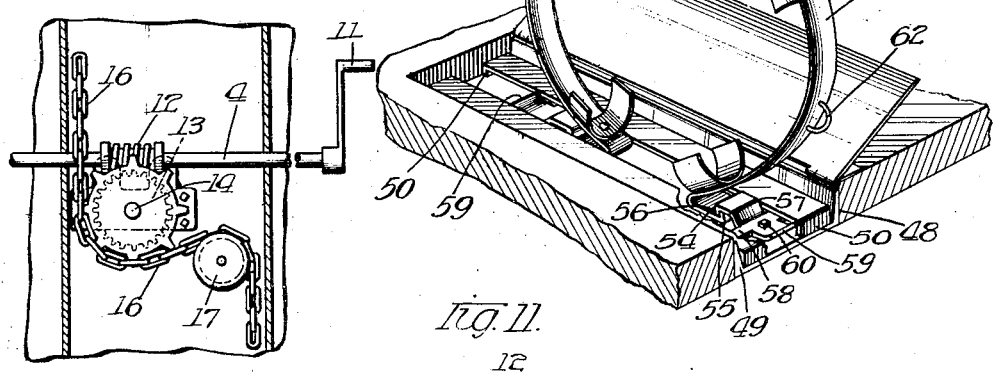

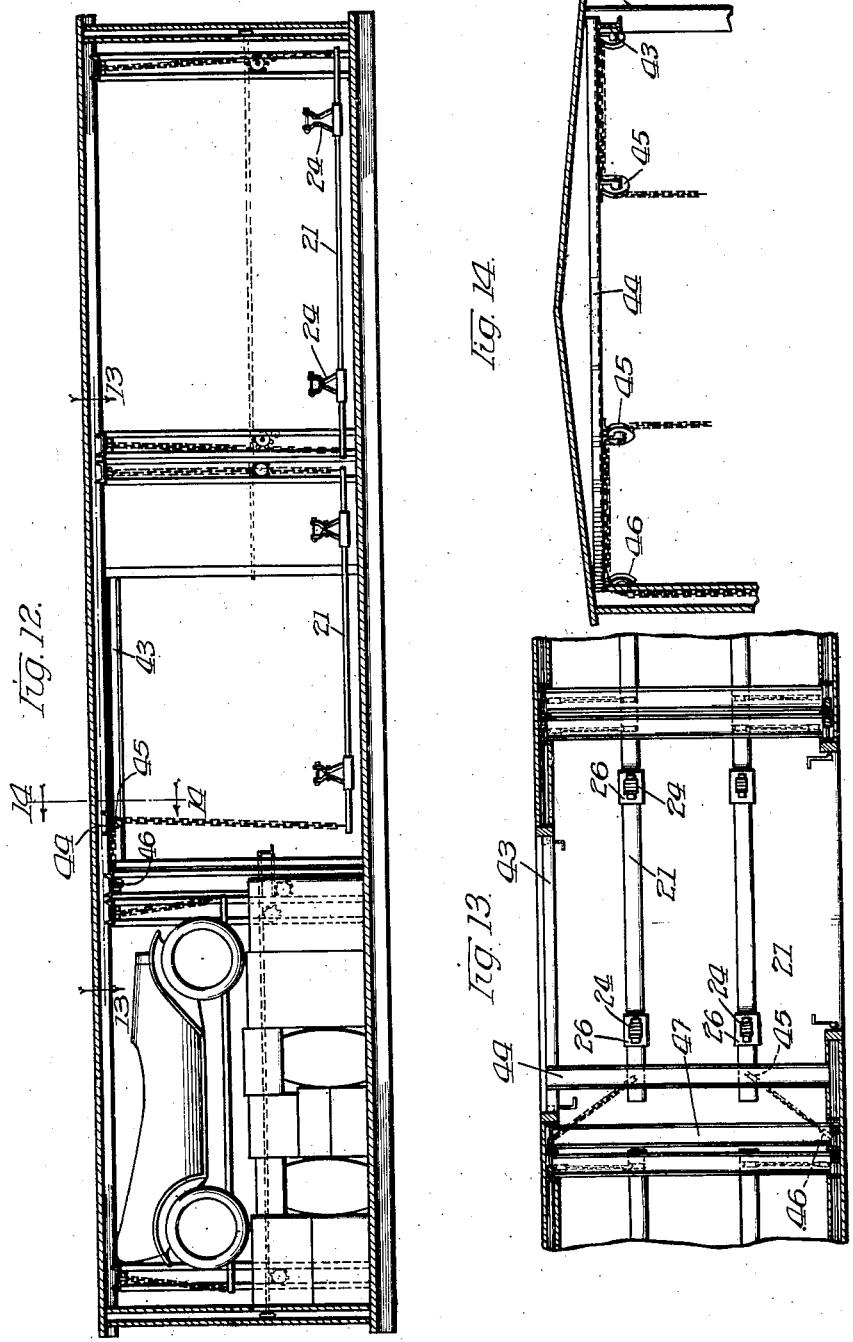

UNITED STATES PATENT OFFICE.

JOHN M. DALY, OF CHICAGO, ILLINOIS.

APPARATUS FOR STORING AND TRANSPORTING VEHICLES.

1,250,982.         Specification of Letters Patent.         Patented Dec. 25, 1917.

Application filed May 15, 1916. Serial No. 97,669.

*To all whom it may concern:*

Be it known that I, JOHN M. DALY, a citizen of the United States, a resident of Chicago, in the county of Cook and State of Illinois, have invented new and useful Improvements in Apparatus for Storing and Transporting Vehicles, of which the following is a specification.

This invention relates to improvements in an apparatus for storing and transporting vehicles and has for its object, the provision of appliances adapted to be installed in a car for the economic loading and transportation of vehicles, particularly motor vehicles therein, being directed to the same art as disclosed and claimed in my co-pending applications filed February 9th, 1916, bearing Serial Numbers 77,308, 77,309, 77,310 and 77,311 and another co-pending application filed March 14th 1916 and bearing Serial Number 84,043.

A further object of this invention is the provision of a car having means installed therein for lifting vehicles and means for securely holding vehicles in raised position and thereunder, so that a plurality of vehicles may be stacked within the car in tiers and securely supported in position so as to obviate the possibility of damage and injury due to movement within the car during transportation, whereby the effective capacity of the car is increased.

Another object of this invention is the provision of a car equipped with appliances for raising a vehicle therein and supporting the same securely in position, whereby the space below may be utilized for the transportation of another vehicle or merchandise of various kinds.

Other objects include improvements in details of construction and operation whereby a simple and efficient mechanism is provided to accomplish the results herein set forth.

To the accomplishment of the foregoing and such other objects as may hereinafter appear, my invention consists in the combination, construction and arrangement of parts hereinafter described and then sought to be defined in the claims, reference being had to the accompanying drawings forming a part hereof and which is a preferred embodiment of my invention, it being understood, however, that various changes may be made in practice within the scope of the claims without digressing from my inventive idea.

In the drawings—

Figure 1 represents a vertical longitudinal section of a car equipped with appliances embodying my invention, two vehicles arranged in tiers being shown at one end and the raising and supporting means being shown in its lowered position in the other end, this view being taken on substantially line 1—1 of Fig. 2;

Fig. 2 is a longitudinal horizontal section of Fig. 1 taken just below the roof of the car;

Fig. 3 is a transverse vertical section taken on line 3—3 of Fig. 1, this view being on an enlarged scale;

Fig. 4 is a vertical section of part of the car showing the manner of connecting the operating means for simultaneous operation;

Fig. 5 is a detailed view in side elevation and partly in section of the supporting and bracing means for the wheels of the vehicle;

Fig. 6 is a fragmentary view in perspective of the supportitng frame, showing one form of the means for engaging the axles of the vehicle;

Fig. 7 is a cross-section taken on Fig. 6, showing the manner of securing the means for engaging the axle of the vehicle;

Fig. 8 is a view in perspective of another form of means for engaging the axle of a vehicle;

Fig. 9 is a perspective view of the supporting and bracing means for the wheels of the vehicle;

Figs. 10 and 11 are detailed views of the raising and lowering mechanism for the lifting frames;

Fig. 12 is a vertical longitudinal section of a car equipped with appliances embodying my invention, a vehicle being shown in raised position at one end with merchandise loaded thereunder, and a lifting means arranged in the center portion of the car so that six vehicles may be loaded in the car in three sets, one above the other;

Fig. 13 is a sectional view on line 13—13 of Fig. 12, showing the central part of the car and the central lifting frame with its operating means; and Fig. 14 is a transverse section on line 14—14 of Fig. 12.

As stated hereinbefore this invention relates to the same class of constructions as disclosed in my pending applications previously referred to and includes lifting frames with raising mechanism therefor, for raising and supporting vehicles in a raised position within the car, coöperating means being provided for securely holding the raised vehicles against movement during transit. Bracing and supporting means are also provided for the lower row of vehicles so that a plurality of vehicles may be loaded within one car, arranged in tiers one above the other. Provision is also made for the center lifting frame so that six vehicles may be transported safely and without injury in the car.

The numeral 1 designates the car which may be of usual standard construction, having the floor 2, the sides 3 which are double-walled to provide the spaces 4 therebetween. 5 designates the roof, 6 the double-walled ends and 7 the doorways. These parts are the customary construction and are mentioned merely for the purpose of facilitating the disclosure.

Supported within the spaced side walls 3 are the operating shafts 8, arranged in pairs on opposite sides of the car, the ends being provided with the sprockets 9 having the connecting chain 10 whereby the pair of operating shafts 8 may be rotated in unison and from the same crank or other source of power 11, whereby one operator may rotate both of the pair of shafts 8. On each shaft is provided the worm 12 meshing with the worm wheel 13 on short shaft 14 having sprocket 15 to receive the raising and lowering chain 16 which runs over the pulley 17. These parts are mounted in the frame 18 and are disposed entirely within the space 4 between the side walls, this mechanism being the same as that disclosed in my prior application above noted, Serial Number 84,043.

These chains 16 extend upwardly over pulleys 19 which are supported by the channel beams 20 from the top of the car, the ends of the chains being connected to the lifting and supporting frames 21. These lifting and supporting frames 21 include the spaced side members 22 which are connected by the arched braces 23 and are preferably of channel shape in cross-section. On these side members I provide in pairs, the locking and supporting means 24 for the axles of the vehicle to be lifted and supported, said supporting means including the base member 25 which is formed with the inturned side flanges 26 to embrace the channel shaped side members 22 of the frame, and has the bolt connection 27 for adjustment along the side members 22, which are provided with the apertures 28 for that purpose. The supporting legs 29 have the flat extremital portions 30 positioned between the base member 25 and the side members 22 of the frame and extend upwardly through an opening in the base member 25, converging to receive the clamping bolt 31 at an intermediate point from which the supporting legs are curved as at 32, to form the yoke or socket 33 to receive the axle 34 of the vehicle, bolt 35 forming the locking means for holding the axle within the yoke or socket 33. This form of locking and supporting means for the axle is used when the vehicle has the truss-rod 36, as shown in full lines in Fig. 3 and in dotted lines in Fig. 6, but when the vehicle is without such a truss-rod, the form of supporting and locking means shown in Fig. 8 may be used, this merely including the base member 37, embracing the side member 22 of the frame 21 like the base member 25 and having the adjusted bolt 38, also of similar construction. The yoke or socket 39 for supporting the axle is provided by a U-shaped member secured to the base member and having the bolt 40 for locking the axle therewithin.

It is therefore seen that when a vehicle is positioned with its axle within the yoke or socket on the supporting means, that the rotation of the shafts 8 will raise the same to an elevated position, as shown in various figures of the drawings, and if necessary, this may be accomplished by one operator, due to the connection 10 between the two shafts. In this elevated position, the frame 21 and the vehicle are braced in position by means of the flexible connection 41 secured to the frame and extending to and connected to the side walls of the car as at 42. In this manner, the raised vehicle is securely supported against movement within the car and consequent damage or injury thereto.

Referring to Figs. 12 and 13 and 14, I show an arrangement for raising and supporting a vehicle in the central portion of the car, the parts being the same as those previously described, but it is necessary to provide the supporting beam 43 over the door-way for supporting the transverse channel-beam 44 to which are secured the pulleys 45, pulleys 46 being secured to another channel-beam 47. The lifting chain extends from the lifting frame 21 over pulley 45 and diagonally to pulley 46, as shown particularly in Figs. 13 and 14, and thence down to the operating mechanism previously described and shown in Figs. 10 and 11. In the form shown in the drawings, each of these chains is operated separately. By this arrangement, I am able to accommodate six vehicles within one car in three tiers of two each. To accomplish this, it is only necessary to provide doors in the ends of the car.

I have described at length the means and mechanism for raising and supporting vehicles in a raised position, and I will now describe the means for holding and bracing the lower row of vehicles in position on the floor of the car, these parts being shown in detail in Figs. 5 and 9. I provide the recess 48 in the floor of the car receiving the upturned channel iron member 49, on which are positioned the side-bars 50 which have the downturned ends 51 so as to space the bars from the channel iron member 49. The supporting and bracing means takes the form of the curved shoe member 52, having the cup-shaped embracing members 53 secured thereto for engaging the wheel or tire of the vehicle and partially embracing the same. These shoe members 52 are bent at their lower portions to provide a flat bearing member 54 which rests on the channel iron member 49 and is provided with the terminal lip or flange 55, which is engaged by the cooperating lip or flange 56 on the end of the locking member 57, this part of the locking member being off-set upwardly for this purpose. The locking member has the laterally extending ears 58 which are postioned in the space between the side bars 50 and the channel iron beam member 49 and slide therein, the rear end of the locking member being upturned as at 59, and fitting into space between the side bars 50, so as to prevent lateral movement. The locking member is provided with the bolt 60 which is adapted to engage one of the plurality of apertures 61 formed in the channel iron member 49, whereby necessary adjustment, both as to size of wheel and wheel base of vehicle is provided for. The shoe members are provided with the eyes 62 which are adapted to receive the transverse chain members 63 which pass therethrough and are secured to the sides of the car, as at 64, springs 65 being interposed therein to take up slack.

While I have described this bracing and supporting member as applied particularly for the lower vehicle, it is to be understood that it is my intention to use the same in connection with the lifting frame 21, it being only necessary to invert the side members 22 thereof, in order to permit its application thereto.

In some cases, it may be necessary to raise one end of a vehicle higher than the other end and this may be readily accomplished by taking up a sufficient number of the links of the chains, as desired.

Attention is directed to the fact that the lifting frames on which the vehicles are raised, are elevated by means of the chain, the connections being made so that there is a direct lift, this doing away with any unnecessary strain and friction.

While I have described the car as equipped with these appliances as particularly adapted for the transportation of vehicles, it is to be understood that a mixed load may be carried thereby, as indicated in Fig. 12 of the drawing, wherein at one end of the car a vehicle is shown in elevated position with a miscellaneous load of merchandise thereunder.

It is also to be understood that I may use in connection with the appliances herein disclosed and described, the chains which engage the wheels or tires of the vehicle and are adjustably braced and locked to the sides of the car as shown in my co-pending applications above referred to, bearing Serial Numbers 77,308, 77,309 and 84,043.

What I claim is:—

1. In combination in a car, a supporting and lifting frame for supporting a vehicle, lifting means connected to each side of said frame, including flexible connections, a windlass for each connection and operating shafts, said operating shafts being operatively connected together so that each frame is lifted uniformly.

2. In combination, in a car, a supporting and lifting frame for raising and supporting a vehicle in raised position, flexible lifting means connected at each end on each side of said frame, windlasses for each flexible lifting means, an operating shaft for said flexible means on each side of said frame, said operating shafts extending longitudinally of the car and operatively connected together, and means for rotating one of said shafts.

3. In combination, in a car, having a roof, double side and end walls, a supporting and lifting frame for raising and supporting a vehicle in raised position, operating shafts extending longitudinally within each of said double side walls, said shafts being operatively connected together by means positioned within said double end walls, flexible means connected to each side of said frame and operated by said shafts to raise and lower said frame and actuated means connected to one of said shafts.

4. In combination, in a car, three sets of supporting and lifting frames for raising vehicles and supporting them in raised position, means for raising said frames and three sets of means for bracing and holding a second tier of vehicles under the vehicles on said frames.

5. In combination in a car, a lifting and supporting frame adapted to receive a vehicle, said frame having spaced side members, and members provided on said side members for engaging and supporting the axles of the vehicle.

6. In combination in a car, a lifting and supporting frame adapted to receive a vehicle, said frame having spaced side members, and members provided on said side members for engaging and supporting the axles of the vehicle, said axle supporting members being adjustable on said side members.

7. In combination in a car, a lifting and supporting frame adapted to receive a vehicle, said frame having spaced side members, and members provided on said side members for engaging and supporting the axles of the vehicle, and means for holding the axles in engagement with said members.

8. In combination in a car, a lifting and supporting frame adapted to receive a vehicle, said frame having spaced side members, and members provided on said side members for engaging and supporting the axles of the vehicle, including a base member adjustable on said side members and holding means on said base member.

9. In combination in a car, a lifting and supporting frame adapted to receive a vehicle including spaced channeled side members having a plurality of axle holding and securing members movably mounted thereon.

10. In combination in a car, a lifting and supporting frame adapted to receive a vehicle, said frame being rectangular in shape and having means for supporting and holding the axles adjacent each wheel.

11. In combination in a car, a lifting and supporting frame adapted to receive a vehicle, said frame being rectangular in shape and having spaced side members and a plurality of axle holding and supporting means adjustably mounted on each side member.

12. In combination in a car, means for engaging the wheels or tires of a vehicle, including a base member, shoe members adapted to embrace the wheel or tire, and locking means adjustably secured to said base member and engaging said shoe members for holding them in adjusted positions.

13. In combination in a car, means for engaging the wheels or tires of a vehicle, including a base member having spaced side bars, shoe members adapted to embrace the wheel or tire, and having flat bearing portions resting on said base member and locking means adjustably secured to said base member and engaging said bracing portions for holding said shoe members in adjusted positions.

14. In combination in a car, means for engaging the wheels or tires of a vehicle, including a base member having spaced side bars, shoe members adapted to embrace the wheel or tire, and having flat bearing portions resting on said base member and locking means adjustably secured to said base member and engaging said bracing portions for holding said shoe members is adjusted positions, said locking means having lateral ears extending between said side bars and base member to prevent upward movement thereof.

15. In combination in a car, means for engaging the wheels or tires of a vehicle, including a base member having spaced side bars, shoe members adapted to embrace the wheel or tire, and having flat bearing portions resting on said base member and locking means adjustably secured to said base member and engaging said bracing portions for holding said shoe members in adjusted positions, said locking means having lateral ears extending between said side bars and base member to prevent upward movement thereof, and having a part upturned between said side bars to prevent lateral movement thereof.

16. In combination in a car, means for engaging the wheels or tires of a vehicle, including a base member having spaced side bars, shoe members adapted to embrace the wheel or tire and having flat flaring portions resting on the base between said spaced side bars, and locking means adjustably secured to the base member and engaging said shoe members for holding them in adjusted position.

17. In combination in a car, means for engaging the wheels or tires of a vehicle, including a base member having side bars spaced from each other and also spaced from the base member, shoe members adapted to embrace the wheel or tire, and locking means adjustably secured to said base member and engaging said shoe member for holding it in adjusted position, and having portions extending underneath said side bars.

JOHN M. DALY.